(12) United States Patent
Ye et al.

(10) Patent No.: US 11,198,069 B2
(45) Date of Patent: *Dec. 14, 2021

(54) SHOOTING GAME PROGRAM WITH AIMING BASED ON A PLURALITY OF POSITION INPUTS

(71) Applicant: GREE, Inc., Tokyo (JP)

(72) Inventors: Ruoyi Ye, Tokyo (JP); Hiroki Kamobayashi, Tokyo (JP)

(73) Assignee: GREE, Inc., Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 16/806,202

(22) Filed: Mar. 2, 2020

(65) Prior Publication Data

US 2020/0197819 A1 Jun. 25, 2020

Related U.S. Application Data

(63) Continuation of application No. 15/942,763, filed on Apr. 2, 2018, now Pat. No. 10,610,791, which is a continuation of application No. 14/834,666, filed on Aug. 25, 2015, now Pat. No. 9,962,616.

(30) Foreign Application Priority Data

Aug. 29, 2014 (JP) .................................. 2014-176017

(51) Int. Cl.
*A63F 13/837* (2014.01)
*A63F 13/428* (2014.01)
*A63F 13/2145* (2014.01)

(52) U.S. Cl.
CPC ........ *A63F 13/837* (2014.09); *A63F 13/2145* (2014.09); *A63F 13/428* (2014.09)

(58) Field of Classification Search
CPC ... A63F 13/837; A63F 13/2145; A63F 13/428
See application file for complete search history.

(56) References Cited

U.S. PATENT DOCUMENTS

2006/0025218 A1 2/2006 Hotta
2014/0080600 A1 3/2014 Knutsson

FOREIGN PATENT DOCUMENTS

JP 2012-210243 A 1/2012
JP 2013-176573 A 9/2013

OTHER PUBLICATIONS

Japanese Office Action dated Dec. 24, 2014 in corresponding Japanese Application No. 2014-176017; 8 pgs.

*Primary Examiner* — Yingchuan Zhang
(74) *Attorney, Agent, or Firm* — Maier & Maier, PLLC

(57) ABSTRACT

A computer game program implements a position information obtaining function of obtaining first position information indicating a first position in a game field and second position information indicating a second position in the game field, a position information updating function of respectively updating the first position information and the second position information to move the first position and the second position in response to an operation input by a player, a position identifying function of determining a third position on a first line in accordance with the second position, the first line being a line that passes through the first position and a predetermined fixed position set in the game field, and a direction determining function of determining a direction in which a predetermined game effect is produced in the game field, in accordance with the first position, the second position, and the third position.

20 Claims, 10 Drawing Sheets

SHOOTING GAME PROGRAM WITH AIMING BASED ON A PLURALITY OF POSITION INPUTS

CROSS-REFERENCE TO RELATED APPLICATIONS

This application claims priority from U.S. patent application Ser. No. 15/942,763, filed on Apr. 2, 2018, entitled "SHOOTING GAME PROGRAM WITH AIMING BASED ON A PLURALITY OF POSITION INPUTS," which claims priority from U.S. patent application Ser. No. 14/834,666, filed on Aug. 25, 2015, entitled "SHOOTING GAME PROGRAM WITH AIMING BASED ON A PLURALITY OF POSITION INPUTS," now U.S. Pat. No. 9,962,616, issued on May 8, 2018, which claims priority from Japanese Patent Application No. 2014-176017, filed on Aug. 29, 2014, the entire contents of which are hereby incorporated by reference.

FIELD

Exemplary embodiments of the disclosure relate generally to a game program for handling the progress of a game.

BACKGROUND

With the spread of personal electronic devices such as smartphones and tablet terminals, more and more games for such electronic devices are being developed in addition to games for home video game consoles. In particular, shooting games have been a popular genre, and variously devised games have been provided. For example, Japanese Unexamined Patent Application Publication No. 2012-210243 discloses a shooting game that enables an unusual move in a battle between first and second moving objects.

However, most existing shooting games such as the one disclosed by Japanese Unexamined Patent Application Publication No. 2012-210243 merely allow a player to change the target position of attack by operating a moving object and thus do not implement any new operability. That is, existing shooting games are devised merely in terms of presentation of the game by using game graphics, with the basic operability of "shooting games" unchanged. Such devising does not seem original and does not make the games more entertaining.

SUMMARY

Exemplary objects of the present disclosure may be to provide a game program capable of providing players with new operability, and the like.

To address the issues, an exemplary embodiment of the game program may cause a computer to implement a position information obtaining function which may obtain first position information indicating a first position in a game field and second position information indicating a second position in the game field, a position information updating function may respectively update the first position information and the second position information to move the first position and the second position in response to an operation input by a player, a position identifying function may determine a third position on a first line in accordance with the second position, the first line may be a line that passes through the first position and a predetermined fixed position set in the game field, and a direction determining function may determine a direction in which a predetermined game effect may be produced in the game field, in accordance with the first position, the second position, and the third position.

An exemplary embodiment of the game program may further cause the computer to implement an effect producing function which may produce the predetermined game effect on an object located in the direction determined by the direction determining function.

An exemplary embodiment of the game program may further cause the computer to implement an attribute associating function which may associate attribute information with the first position and attribute information with the second position in response to the operation input by the player, wherein the effect producing function may produce the predetermined game effect in accordance with a combination of the attribute information associated with the first position and the attribute information associated with the second position.

An exemplary embodiment of the game program may further cause the computer to implement a characteristic determining function which may determine a correlation between a characteristic set for the object and a characteristic identified by a combination of the attribute information associated with the first position and the attribute information associated with the second position, wherein the effect producing function may change the predetermined game effect depending on a determination result obtained by the characteristic determining function.

An exemplary embodiment of the game program may further cause the computer to implement a display output function which may output display information for displaying a specified position object that explicitly indicates at least one of the first position and the second position in accordance with the corresponding attribute information associated by the attribute associating function.

In an exemplary embodiment of the game program, the attribute information may at least include information indicating for example, a shape, a color, an image, a pattern, or the like, of the specified position object or a combination thereof, and the display output function may output display information for displaying the specified position object in accordance with the information indicating, for example, a shape, a color, an image, a pattern, or the like, of the specified position object or a combination thereof included in the attribute information.

In an exemplary embodiment of the game program, the position identifying function may determine, as the third position, a position where the first line crosses a second line connecting the second position and another fixed position different from the predetermined fixed position.

In an exemplary embodiment of the game program, the direction determining function may determine, as the direction in which the predetermined game effect is produced, a direction which may include a line of aim connecting the third position and a position of aim on a third line extending from the predetermined fixed position to the other fixed position.

In an exemplary embodiment of the game program, the position of aim may be a position corresponding to a middle point of the third line.

An exemplary embodiment of the game program may further cause the computer to implement a figure display output function which may output figure information for displaying a figure determined in accordance with a relationship among the first position, the second position, and the third position.

In an exemplary embodiment of the game program, the figure display output function may increase or decrease the predetermined game effect in accordance with an area of the figure.

In an exemplary embodiment of the game program, a game based on the game program may be, for example, a shooting game, or the like, for attacking an object displayed in the game field, and the predetermined game effect may be an effect of, for example, attacking the object located in the direction determined by the direction determining function.

An exemplary embodiment of the game program may further cause the computer to implement a bonus giving function, or the like, of giving a predetermined bonus to the player in accordance with a result of attacking the object.

In an exemplary embodiment of the game program, each of the first position and the second position may move in response to a drag operation by the player.

In an exemplary embodiment of the game program, each of the first position and the second position may rotate about a predetermined position in accordance with a rotation angle specified by an operation input by the player.

To address the issues, a method for controlling a computer according to another exemplary embodiment may include a position information obtaining step which may obtain first position information indicating a first position in a game field and second position information indicating a second position in the game field, a position information updating step may respectively update the first position information and the second position information to move the first position and the second position in response to an operation input by a player, a position identifying step may determine a third position on a first line in accordance with the second position, the first line being a line that passes through the first position and a predetermined fixed position set in the game field, and a direction determining step which may determine a direction in which a predetermined game effect is produced in the game field, in accordance with the first position, the second position, and the third position.

To address the issues, a computer according to another exemplary embodiment may include a position information obtaining unit that may obtain first position information indicating a first position in a game field and second position information indicating a second position in the game field, a position information updating unit that may respectively update the first position information and the second position information to move the first position and the second position in response to an operation input by a player, a position identifying unit that may determine a third position on a first line in accordance with the second position, the first line being a line that passes through the first position and a predetermined fixed position set in the game field, and a direction determining unit that may determine a direction in which a predetermined game effect is produced in the game field, in accordance with the first position, the second position, and the third position.

In exemplary embodiments of the game program, the method for controlling a computer, and the computer according to the disclosure, first position information indicating a first position in a game field and second position information indicating a second position in the game field may be obtained. The first position information and the second position information may be respectively updated so that the first position and the second position move in response to an operation input by a player. A third position may be determined, in accordance with the second position, on a first line that passes through the first position and a predetermined fixed position set in the game field. A direction in which a predetermined game effect is produced may be determined in accordance with the first position, the second position, and the third position. Accordingly, the game program, the method for controlling a computer, and the computer according to the exemplary embodiments can advantageously provide players with new operability.

BRIEF DESCRIPTION OF THE DRAWINGS

Exemplary

Exemplary FIG. 2A illustrates a process in which the aim is set in a direction determined based on a plurality of positions.

Exemplary FIG. 2B illustrates a process in which the direction changes in response to a player moving a specified position to the right.

Exemplary

Exemplary

Exemplary FIG. 5A is a process in which all objects are cleared from the game field and the game field is displayed brightly.

Exemplary FIG. 5B is a process in which the game field is filled with objects and is displayed darkly.

Exemplary

Exemplary

Exemplary FIG. 7A illustrates a process in which a position moves on a first line in response to long-pressing an input screen with the left thumb.

Exemplary FIG. 7B illustrates a process in which the position moves on a second line in response to long-pressing the input screen with the right thumb.

Exemplary FIG. 8A illustrates a process in which the first specified position and the second specified position rotate counterclockwise in response to long-pressing the input screen with the left thumb.

Exemplary FIG. 8B illustrates a process in which the first specified position and the second specified position rotate clockwise in response to long-pressing the input screen with the right thumb.

Exemplary

Exemplary

DETAILED DESCRIPTION

Firstly, a configuration in which a game program according to the exemplary embodiments may be implemented as a so-called native application (native game) and may be executed by a mobile terminal which may function as a computer will be described with reference to exemplary FIGS. 1 to 9.

Subsequently, a configuration in which the game program according to the exemplary embodiments may be implemented as a so-called web application (web game) and may be partially or entirely executed by a server apparatus which may function as the computer according in which the execution result may be returned to the mobile terminal may be described with reference to exemplary FIG. 10.

Referring to FIGS. 1 to 9, exemplary embodiments will be described.

Figure 2A:
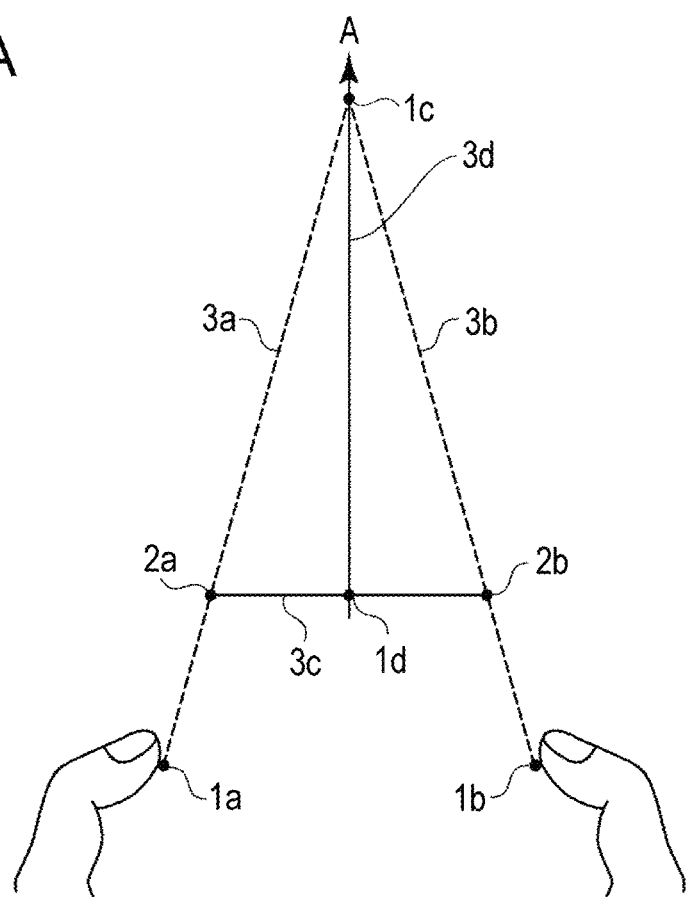
FIG. 2A is a schematic diagram illustrating an example of an operation method for a game implemented by a game program according to an embodiment, specifically
Figure 2B:
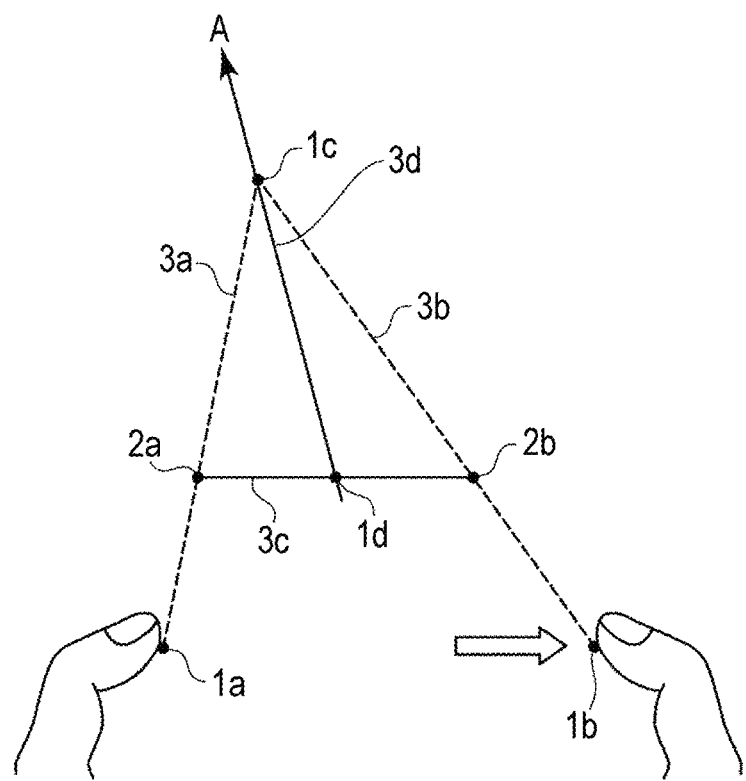
FIG. 2B is a schematic diagram illustrating an example of an operation method for a game implemented by a game program according to an embodiment, specifically

FIGS. 2A and 2B may be schematic diagrams each illustrating an operation method for a game implemented by a game program according to the exemplary embodiments. Specifically, FIG. 2A may illustrate a process in which the aim may be set in a direction A determined based on a plurality of positions, whereas FIG. 2B may illustrate a process in which the direction A changes in response to a player moving a specified position 1b to the right. For purposes of this disclosure a plurality of puzzle elements may be any number of puzzle elements as would be understood by a person of ordinary skill in the art.

As illustrated in exemplary FIG. 2A, a player may specify two positions in a game field by touching a touch panel (an input unit 40 described later), or the like, of a mobile terminal 100 with their thumbs (or pointing devices such as styluses). At this time, the game program may obtain coordinate information (position information) 5b indicating each of a specified position (first position) 1a and the specified position (second position) 1b. The game program may then determine, as a position (third position) 1c, a position where a line (first line) 3a connecting the specified position 1a and a fixed position (predetermined fixed position) 2a set in the game field crosses a line (second line) 3b connecting the specified position 1b and a fixed position (another fixed position) 2b.

The game program may then set the aim in the direction A which may be a direction in which a predetermined game effect may be produced. The direction A may be a direction toward the position 1c from the side where the specified positions 1a and 1b are located and may change in response to movement of the specified positions 1a and 1b and the position 1c. For example, the game program may set the aim in the direction A including a line of aim 3d which can connect the position 1c and a position of aim 1d corresponding to the middle point of a line (third line) 3c extending from the fixed position 2a to the fixed position 2b.

As illustrated in exemplary FIG. 2B, if the player performs a drag operation with the thumb(s) touching the touch panel (i.e., smoothly moves the thumb(s) on the touch panel while keeping the thumb(s) in contact with the touch panel), the game program may move the specified position 1a and/or the specified position 1b in response to the movement. The movement of the specified position 1a and/or the specified position 1b may change (coordinates of) the position 1c and thus the direction A in which the aim is set. That is, the player can change the direction A to a desired direction (e.g., a direction in which a target object of attack is located) by specifying two positions (i.e., the specified positions 1a and 1b) among a plurality of positions (i.e., the specified positions 1a and 1b, the fixed positions 2a and 2b, and the position of aim 1d) that can uniquely set the direction A.

Accordingly, the game program can provide players with new operability that are different from those provided by existing shooting games in which players change the target position of attack simply by operating their object, for example.

Figure 1:
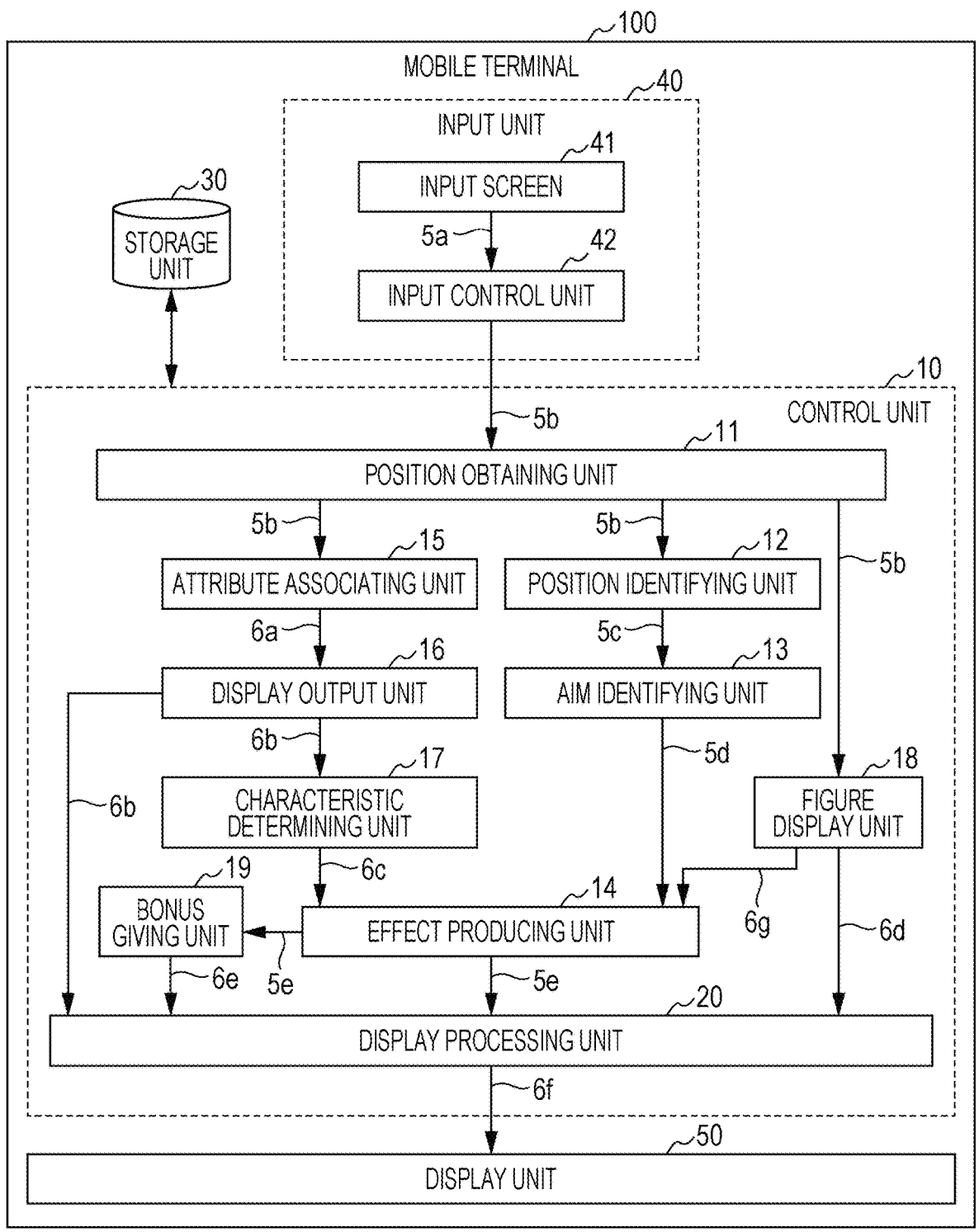
FIG. 1 is a block diagram illustrating an example of a configuration of related part of a mobile terminal according to an embodiment.

Exemplary FIG. 1 is a block diagram illustrating an example of a configuration of related part of the mobile terminal 100. As illustrated in exemplary FIG. 1, the mobile terminal 100 may include a control unit 10, a storage unit 30, the input unit 40, and a display unit 50.

The control unit 10 may integrally control various functions of the mobile terminal 100. The control unit 10 may include a position obtaining unit 11, a position identifying unit 12, an aim identifying unit 13, an effect producing unit 14, an attribute associating unit 15, a display output unit 16, a characteristic determining unit 17, a figure display unit 18, a bonus giving unit 19, and a display processing unit 20.

The position obtaining unit (position information obtaining function) 11 may obtain, from an input control unit 42 of the input unit 40, the coordinate information 5b (first position information) indicating the specified position 1a in the game field and the coordinate information 5b (second position information) indicating the specified position 1b in the game field. The coordinate information 5b may include information that enables identification of each of the specified positions 1a and 1b which may correspond to positions specified by a touch operation by the player. Note that a position specified by a touch operation and the coordinate information 5b indicating the specified position 1a or 1b may only need to be associated with each other. That is, a position touched by the player on an input screen 41 of the input unit 40 may be different from the specified position 1a or 1b.

The position obtaining unit (position information updating function) 11 may update the coordinate information 5b (first position information and second position information) to move the specified positions 1a and 1b in response to an operation input by the player. The position obtaining unit 11 may output the coordinate information 5b to the position identifying unit 12, the attribute associating unit 15, and the figure display unit 18.

The position identifying unit (position identifying function) 12 may determine the position 1c, for example, such that the position 1c moves in response to movement of the specified position 1b indicated by the coordinate information 5b on the line 3a that passes through the specified position 1a indicated by the coordinate information 5b and the fixed position 2a set in the game field. For example, the position identifying unit 12 may determine, as the position 1c, a position where the line 3a connecting the fixed position 2a and the specified position 1a crosses the line 3b connecting the specified position 1b and the fixed position 2b. The position identifying unit 12 may output, to the aim identifying unit 13, coordinate information 5c including, for example, information that enables identification of the position 1c.

The aim identifying unit (direction determining function) 13 may determine the direction A in which a predetermined game effect may be produced, based on the specified positions 1a and 1b and the position 1c. In one exemplary embodiment, the aim identifying unit 13 may set the aim in the direction A which is a direction toward the position 1c from the side where the specified positions 1a and 1b are located and which may change in response to movement of the specified positions 1a and 1b and the position 1c, as the direction in which a predetermined game effect is produced.

For example, the aim identifying unit 13 may set the aim in the direction A including the line of aim 3d that connects the position 1c and the position of aim 1d (which may be a position corresponding to the middle point of the line 3c, for example) on the line 3c extending from the fixed position 2a to the fixed position 2b. The aim identifying unit 13 may output, to the effect producing unit 14, direction information 5d that includes, for example, information concerning the direction A in which the aim is set.

The effect producing unit (effect producing function) 14 may produce a predetermined game effect in the direction A in which the aim may be set by the aim identifying unit 13. Suppose that the game implemented by the game program is a shooting game for attacking objects 4 (FIG. 3) displayed in the game field. In such a case, the "predetermined game effect" may be an effect of attacking the object 4 located in the direction A in which the aim is set by the aim identifying unit 13, for example.

Figure 3:
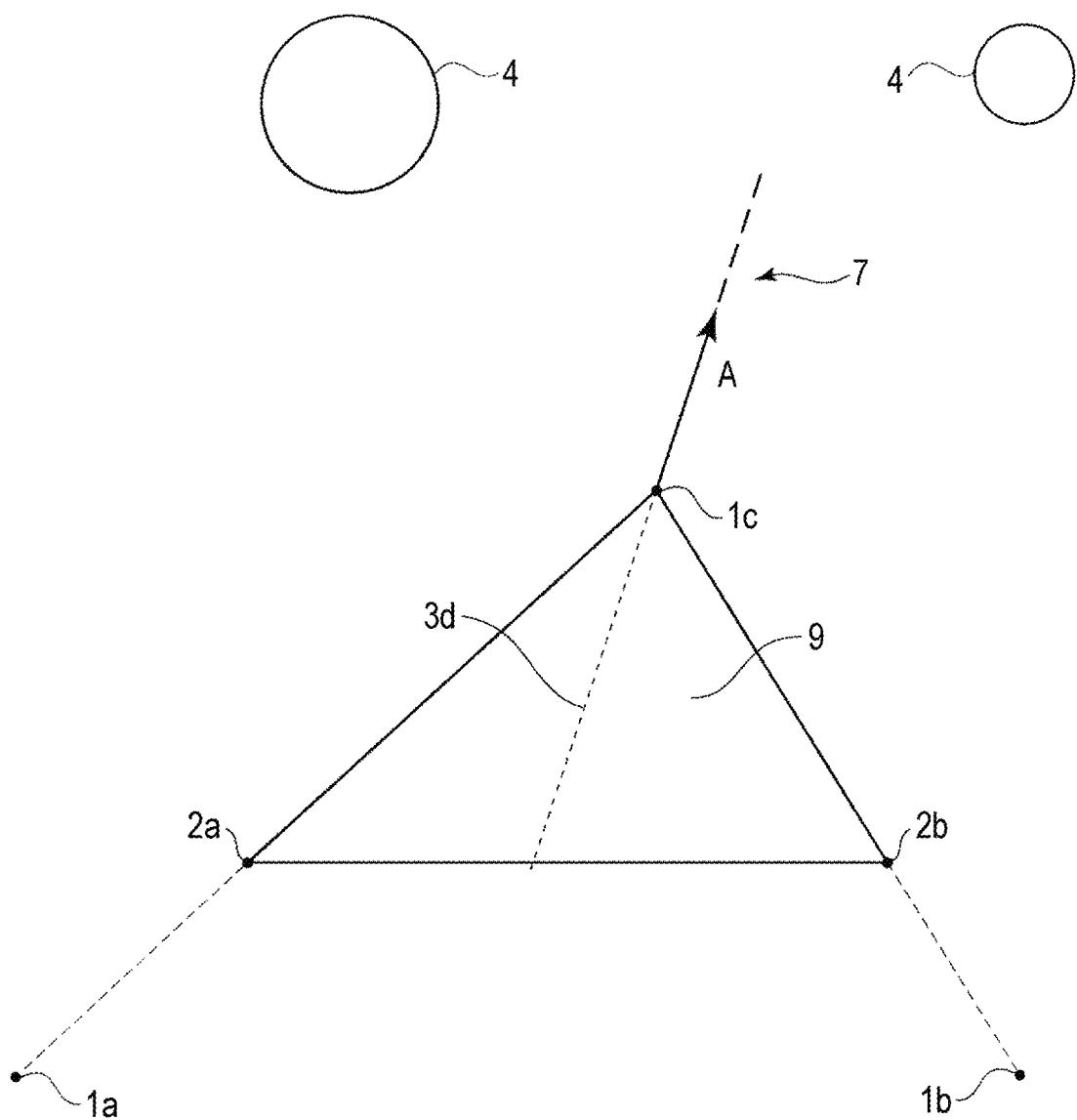
FIG. 3 is a schematic diagram illustrating a state of attacking an object that comes flying from the top toward the bottom of a game field, by firing a bullet in the direction.

Exemplary FIG. 3 is a schematic diagram illustrating a state where a player attacks the objects 4 that come flying from the top toward the bottom of the game field one after another, by firing a bullet 7, or the like, in the direction A. As illustrated in exemplary FIG. 3, the player can attack the object 4 by firing the bullet 7 in the direction A along the line of aim 3d. In this case, the effect producing unit 14 may output bullet display information for displaying the bullet 7 and determine whether the bullet 7 hits the object 4. Upon determining that the bullet 7 hits the object 4, the effect producing unit 14 may produce an effect of, for example, reducing the hit points (durability) of the object 4. In addition, the effect producing unit 14 can produce an effect of destroying the object 4 upon the hit points of the object 4 becoming zero.

Accordingly, the game program can implement a shooting game involving new operability that are different from those provided by existing shooting games in which players change the target position of attack simply by operating their devices, for example. The effect producing unit 14 may output, to the bonus giving unit 19 and the display processing unit 20, effect information 5e that includes information concerning the predetermined game effect.

Although exemplary FIG. 3 (and other figures) illustrates the bullet 7 fired in the direction A by a dashed line, the bullet 7 can be expressed in various ways in accordance with the design and presentation of the game, as would be understood by a person of ordinary skill in the art. For example, the effect producing unit 14 can output the bullet display information for displaying the bullet 7 that looks like a missile. Examples of the method for producing an effect of damaging (attacking) the object 4 include, but are not limited to, (1) launching a shell, (2) launching a homing missile, and (3) dropping a ground bomb in addition to firing the bullet 7 in the direction A as a predetermined game effect produced by the effect producing unit 14.

In the case of launching a shell (so-called "bomb") in the direction A, that is, in the case of (1), the effect producing unit 14 can produce an effect of causing the shell to explode in the direction A and to damage the object 4 located in the vicinity of the position of explosion. In the case of launching a homing missile in the direction A, that is, in the case of (2), the effect producing unit 14 can produce an effect of causing the homing missile to track the object 4 located within a predetermined range including the line of aim 3d and to hit and damage the object 4. In the case of dropping a ground bomb in the direction A, that is, in the case of (3), the effect producing unit 14 can produce an effect of causing a ground bomb to fall in accordance with a virtual gravity that works in the game field and to damage the object 4 located in the vicinity of the impact position.

That is, the effect producing unit 14 can produce a predetermined game effect on the object 4 located in the vicinity of the line of aim 3d (within a predetermined range including the line of aim 3d) that extends toward the position 1c from the side where the specified positions 1a and 1b are located and passes through the position 1c. Accordingly, the game program can implement a shooting game involving new operability that are different from those provided by existing shooting games in which players change the target position of attack simply by operating their devices, for example.

The attribute associating unit (attribute associating function) 15 may associate attribute information 6a with each of the specified positions 1a and 1b in response to an operation input by the player. The attribute information 6a may at least include information indicating a shape, a color, an image, a pattern, or the like, of a specified position object 8 (described later in FIG. 4), or a combination thereof. The attribute associating unit 15 may output the attribute information 6a to the display output unit 16.

The display output unit (display output function) may output display information 6b for displaying the specified position object 8 which may explicitly indicate at least one of the specified positions 1a and 1b in accordance with the corresponding attribute information 6a associated by the attribute associating unit 15. Details regarding the specified position object 8 will be described later. The display output unit 16 may output the display information 6b to the characteristic determining unit 17 and the display processing unit 20.

The characteristic determining unit (characteristic determining function) 17 may determine a correlation between a predetermined characteristic set for the object 4 and a characteristic identified by a combination of the attribute information 6a associated with the specified position 1a and the attribute information 6a associated with the specified position 1b. A process performed by the characteristic determining unit 17 will be described in detail later. The characteristic determining unit 17 may output a determination result 6c to the effect producing unit 14.

The figure display unit (figure display output function) 18 may output figure information 6d for displaying a figure determined based on a relationship (positional relationship) among the specified positions 1a and 1b and the position 1c (e.g., a triangle 9 (described later) connecting three points of the fixed positions 2a and 2b and the position 1c). The figure display unit 18 may also increase or decrease a predetermined game effect produced by the effect producing unit 14 depending on, for example, the area of the figure (e.g., the triangle 9). The figure display unit 18 may output the figure information 6d to the display processing unit 20 and area information 6g that may include information concerning the area of the figure to the effect producing unit 14.

The bonus giving unit (bonus giving function) 19 may give a predetermined bonus to a player in accordance with a result of attacking the objects 4. In one exemplary embodiment, upon being supplied with the effect information 5e by the effect producing unit 14, the bonus giving unit 19 may give a predetermined bonus (e.g., a point or a character or item usable in the game) to a player in accordance with the predetermined game effect (the impact of the damage to the object 4) included in the effect information 5e. The bonus giving unit 19 may output, to the display processing unit 20, bonus information 6e that includes information concerning the predetermined bonus.

The information (the bonus information 6e) concerning a bonus given by the bonus giving unit 19 may be uploaded to a server apparatus that is connected to the mobile terminal 100 to be able to communicate with the mobile terminal 100. Alternatively, the server apparatus may include the bonus giving unit 19, the mobile terminal 100 may upload the progress of the game to the server apparatus, and the bonus giving unit may generate the bonus information 6e in the server apparatus and store the bonus information 6e in a predetermined storage unit. Collectively storing various kinds of information (e.g., the bonus information 6e) in the server apparatus may allow the server apparatus to present ranking information to players in accordance with a quantity of bonuses given to the individual players or to honor a player who has broken the largest number of objects 4, for example. Accordingly, the mobile terminal 100 and the server apparatus can provide a highly entertaining game.

The display processing unit 20 may generate screen information 6f for displaying a game screen on the display unit 50, based on the effect information 5e input from the effect producing unit 14, the display information 6b input from the display output unit 16, the figure information 6d input from the figure display unit 18, and the bonus information 6e input from the bonus giving unit 19. The display processing unit 20 may output the screen information 6f to the display unit 50. In the case of implementing the game program as a web application as described later, the display processing unit 20 may output the screen information 6f to the display unit 50 after (1) generating the screen information 6f based on various kinds of information received from the server apparatus or (2) receiving the screen information 6f from the server apparatus. In this way, the display processing unit 20 can display the game screen on the display unit 50.

In addition, the display processing unit 20 can determine whether the object 4 hits the base of the triangle (the line 3c extending between the fixed positions 2a and 2b) and can reduce health (hit points) set for the player upon determining that the object 4 hits the base of the triangle 9. In some exemplary embodiments, the display processing unit 20 can make the game over (i.e. end the game) (1) if health of the player becomes zero or (2) if one of the objects 4 that come flying from the top of the game field (game screen) has reached the bottom of the game field. Alternatively, the display processing unit 20 can make the game over in other ways, as desired.

The input unit 40 may accept a touch operation by the player. The input unit 40 may be a touch panel capable of detecting a touch operation, for example. The input unit 40 may include the input screen 41 and the input control unit 42. Note that the way of giving the mobile terminal 100 an input is not limited to a touch operation using the touch panel. For example, an input may be given by pressing a predetermined input key, or by other methods, as desired.

The input screen 41 may be a device (e.g., a touch screen included in the touch panel, or the like) capable of detecting a position specified by a touch operation by the player. The input screen 41 may output, to the input control unit 42, a touch signal 5a including information corresponding to the specified position.

The input control unit 42 may generate the coordinate information 5b that includes information concerning a position on the input screen 41 which enables identification of the position specified by the player, based on the touch signal 5a input from the input screen 41. As described before, the position touched by the player on the input screen 41 may be different from a position (the specified position 1a or 1b) in the game field specified by the position. In such a case, from the viewpoint of the player, the tip of the thumb touching the input screen 41 (touch panel) may be shifted from the specified position (1a or 1b) displayed on the display unit 50 as a result of the touch.

The display unit 50 may be a device that displays a game screen, or the like. In some exemplary embodiments, the display unit 50 may be a liquid crystal display. Exemplary FIG. 1 illustrates the input unit 40 and the display unit 50 separately in order to explicitly indicate functions thereof; however, for example, in the case where the input unit 40 is a touch panel and the display unit 50 is a liquid crystal display, or the like, the input unit 40 and the display unit 50 may be integrated in to a single device.

The storage unit 30 may be a storage device constituted by any given recording medium, for example, a hard disk drive, a solid state drive (SSD), a semiconductor memory, or a digital versatile disc (DVD), or the like. The storage unit 30 may store a game program capable of controlling the mobile terminal 100 and data.

Figure 4:
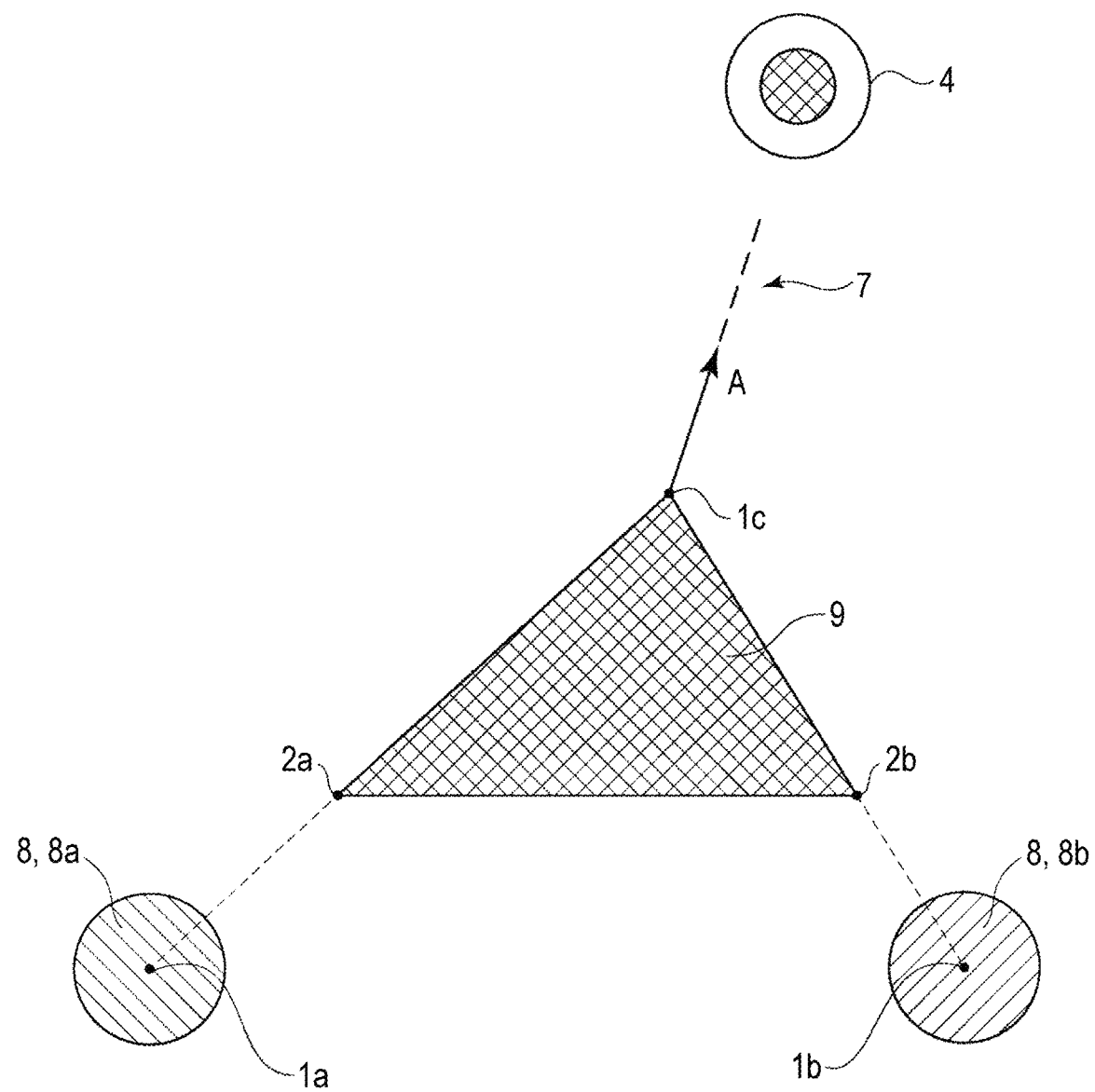
FIG. 4 is a schematic diagram illustrating an example of a game screen that displays specified position objects at first and second specified positions each associated with attribute information.

Exemplary FIG. 4 is a schematic diagram illustrating an example of a game screen that displays specified position objects 8a and 8b respectively at the specified positions 1a and 1b each associated with the attribute information 6a. As described before, the attribute associating unit 15 can associate the attribute information 6a with each of the specified positions 1a and 1b in response to an operation input by a player.

For example, the attribute associating unit 15 may associate the attribute information 6a, which can include information indicating a color (e.g., red) and a shape (e.g., circular), or the like, of the specified position object 8a with the specified position 1a and may associate the attribute information 6a including information indicating a color (e.g., yellow) and a shape (e.g., circular), or the like, of the specified position object 8b with the specified position 1b. The display output unit 16 may output the display information 6b for displaying the specified position objects 8a and 8b in a manner as illustrated in FIG. 4 in accordance with the information included in the attribute information 6a.

The player can change the attribute information 6a by giving an input to the mobile terminal 100 via the input unit 40. The attribute associating unit 15 can change the attribute information 6a associated with the specified position 1a and/or the specified position 1b, for example, such that the color of the specified position object 8a changes (sequentially to red, yellow, green, and blue, for example) every time the player taps the input screen 41.

In other exemplary embodiments, the attribute associating unit 15 can change the attribute information 6a associated with the specified position 1a and/or the specified position 1b, for example, such that the shape of the specified position object 8a changes (sequentially to a circle, a rectangle, a rhomboid, and a hexagon, for example) every time the player taps the input screen 41. In still other exemplary embodiments, the attribute associating unit 15 can change the attribute information 6a associated with the specified position 1*a* and/or the specified position 1*b*, for example, such that the size of the specified position object 8*a* and/or the specified position object 8*b* changes in accordance with a period for which the player long-presses the input screen 41 (for example, at the position(s) where the specified position object 8*a* and/or the specified position object 8*b* are displayed). The display output unit 16 may output the display information 6*b* for displaying the specified position objects 8*a* and 8*b* so that, for example, the color, shape, size, or the like, of the specified position objects 8*a* and 8*b* changes in accordance with the information concerning the color, shape, size, or the like, included in the resulting attribute information 6*a*.

The figure display unit 18 may output the figure information 6*d* for displaying the triangle 9 connecting the three points of the fixed positions 2*a* and 2*b* and the position 1*c* (i.e., a figure determined by a relationship among the specified positions 1*a* and 1*b* and the position 1*c*). At this time, the figure display unit 18 can identify a characteristic of the triangle 9 based on a combination of the attribute information 6*a* associated with the specified position 1*a* and the attribute information 6*a* associated with the specified position 1*b*. For example, suppose that the attribute information 6*a* including information indicating that the specified position object 8*a* is red is associated with the specified position 1*a*, and the attribute information 6*a* including information indicating that the specified position object 8*b* is yellow is associated with the specified position 1*b* as described above. In such a case, the figure display unit 18 may identify a characteristic that the triangle 9 is orange (a mixed color of red and yellow).

In addition, the figure display unit 18 can identify a characteristic of the triangle 9 by combining the attribute information 6*a* associated with the specified position 1*a* and the attribute information 6*a* associated with the specified position 1*b* in a ratio between the size of the specified position object 8*a* and the size of the specified position object 8*b*. For example, suppose that the attribute information 6*a* including information indicating that the specified position object 8*a* is red is associated with the specified position 1*a* and the attribute information 6*a* including information indicating that the specified position object 8*b* is yellow is associated with the specified position 1*b* as described above and that a ratio between the size of the specified position object 8*a* and the size of the specified position object 8*b* is 2:3. In such a case, the figure display unit 18 can identify a characteristic that the triangle 9 has a mixed color (yellowish orange) obtained by mixing red and yellow in a ratio of 2:3 (40%:60%).

The characteristic determining unit 17 may determine a correlation between a predetermined characteristic (e.g., orange) set for the object 4 and a characteristic (e.g., orange) identified by a combination of the attribute information 6*a* associated with the specified position 1*a* and the attribute information 6*a* associated with the specified position 1*b*. The effect producing unit 14 may then produce a predetermined game effect in accordance with the determination result 6*c* obtained by the characteristic determining unit 17. In the example described before, the characteristic determining unit 17 may determine that the identified characteristic and the characteristic set for the object 4 correlate with each other because colors (orange) match. Accordingly, the effect producing unit 14 may produce an effect of reducing the hit points (durability) of the object 4. In contrast, if the characteristic determining unit 17 determines that the colors do not match and the characteristics do not correlate with each other, the effect producing unit 14 may not produce the predetermined game effect. In other words, if the characteristics do not correlate with each other, the attack may not be effective.

That is, in order to attack the objects 4 that come flying from the top toward the bottom of the game screen one after another, the player may not only set the aim in the direction A in which one of the objects 4 is located, but may also appropriately change the attribute information 6*a* associated with the specified position 1*a* and/or the specified position 1*b* in accordance with the characteristic of the object 4. Accordingly, the game program can implement a game with more variations.

The effect producing unit 14 can be configured not to produce the predetermined game effect (as described above) or configured to produce the predetermined game effect by reducing the effect if the characteristic determining unit 17 determines that the characteristics do not correlate with each other. For example, if the characteristics do not correlate with each other, the effect producing unit 14 may produce the effect by halving the effect of reducing the hit points (durability) of the object 4 (that is, the damage to the object 4 is halved). In this way, the game program can implement a game with more variations.

The player can change the predetermined game effect produced by the effect producing unit 14 by giving an input to the mobile terminal 100 via the input unit 40 and changing the attribute information 6*a*. For example, the attribute associating unit 15 can change the method for producing an effect of damaging (attacking) the object 4 from launching a shell to launching a high explosive as the predetermined game effect produced by the effect producing unit 14. In this case, the operation for changing the attribute information 6*a* and the operation for changing the predetermined game effect may be performed as one operation or different operations.

Further, the attribute associating unit 15 can respectively associate first and second effects with the specified positions 1*a* and 1*b* and change the first and second effects. In this case, the effect producing unit 14 can produce, as the predetermined game effect, a combinational effect of the first effect and the second effect. For example, if the attribute associating unit 15 associates a homing missile (first effect) with the specified position 1*a* and a ground bomb (second effect) with the specified position 1*b*, the effect producing unit 14 can produce, as the predetermined game effect, an effect of launching a "homing ground bomb capable of tracking an enemy on land" (combination of the first effect and the second effect).

The game implemented by the above configuration can be expressed as a game using any number of light sources. That is, the game field may be illuminated by colored light beams emitted by two light sources each having a predetermined color and located at the specified positions 1*a* and 1*b*, and the colored light beams may spread over the game field with part of them blocked by a shield (the line 3*c*), or the like, connecting the fixed positions 2*a* and 2*b* and may mix together at the position 1*c*. Behind the shield (on the side where the position 1*c* is located), diffraction beams of the colored light beams may form the triangle 9 having the base defined by the respective end points (the fixed positions 2*a* and 2*b*) of the shield and the apex at the position 1*c*. The player may change the shape of the triangle 9 by moving the specified positions 1*a* and 1*b* and changes the mixed color of the colored light beams by changing the colors of the two light sources. Then, the game effect may be produced in accordance with the mixed color. In this way, the game program can provide players with new operability.

As described above, the figure display unit 18 can increase or decrease the predetermined game effect produced by the effect producing unit 14 in accordance with the area of the triangle 9. In an exemplary embodiment, in the case where the effect producing unit 14 receives, from the figure display unit 18, the area information 6g that includes information concerning the area of the triangle 9, the effect producing unit 14 can produce, as one of the predetermined game effects, (1) an effect of changing a predetermined parameter (e.g., health or defense parameter) set for the player and/or (2) an effect of changing the skill which the player can use. In this way, the game program may allow the player not only to decide upon the direction A of attack but also to figure out a strategy using the area of the triangle 9 and, thus, can make the game more interesting.

The player can avoid a predetermined object (e.g., an attack to the triangle 9 by an enemy character or an obstacle approaching the triangle 9) that can harm the player if the object hits the triangle 9, by increasing or decreasing the area of the triangle 9. In this way, the game program can allow the player to figure out a sophisticated strategy using the area of the triangle 9 and, thus, can make the game more interesting.

Figure 5A:
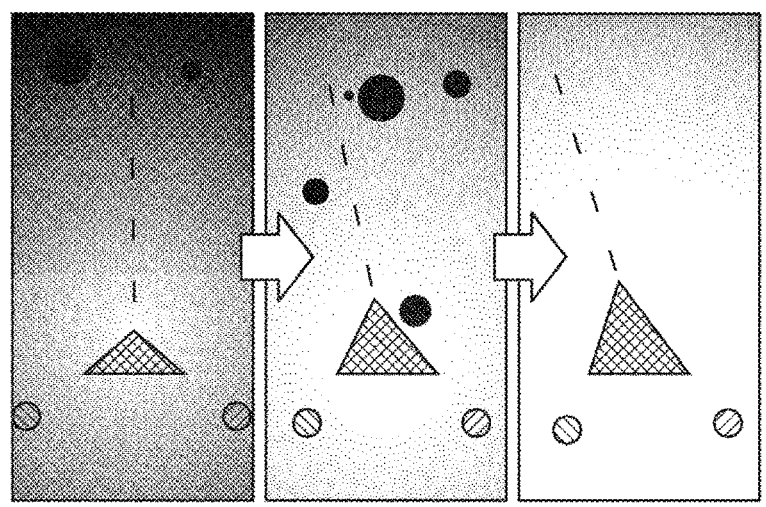
FIG. 5A is a schematic diagram illustrating an example of presentation of the game implemented by the game program, specifically
Figure 5B:
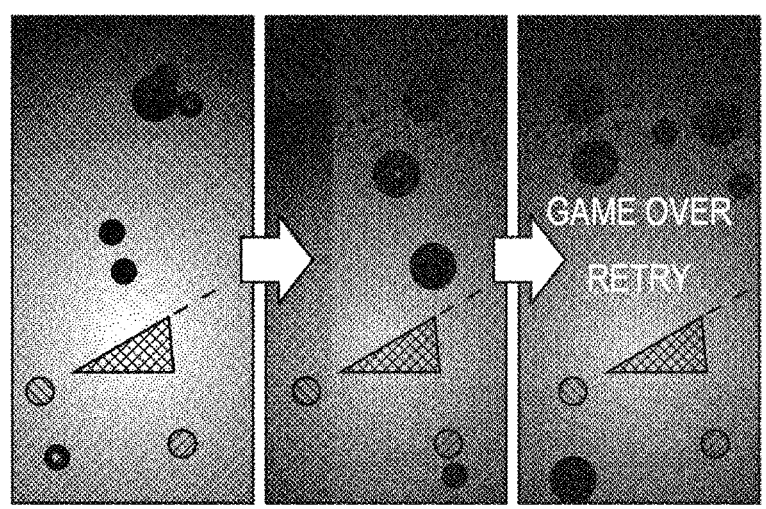
FIG. 5B is a schematic diagram illustrating an example of presentation of the game implemented by the game program, specifically

Exemplary FIGS. 5A and 5B are schematic diagrams each illustrating an example presentation of the game implemented by the game program. Exemplary FIG. 5A may illustrate a process in which all the objects 4 are cleared from the game field and the game field is displayed brightly, whereas exemplary FIG. 5B may illustrate a process in which the game field is filled with the objects 4 and is displayed darkly.

As illustrated in exemplary FIG. 5A, the game program can make the color of the game field brighter and brighter as the number of objects 4 in the game field decreases as a result of the player attacking and destroying the objects 4 by firing the bullets 7 in the direction A. In this way, the game program can allow the player to intuitively understand the progress of the game. The game program also can collectively remove the objects 4 displayed as black balls. In this way, the game program can allow the player to have a sense of fulfilment to get rid of the objects 4.

As illustrated in exemplary FIG. 5B, the game program can make the color of the game field darker and darker every time the object 4 hits the base of the triangle 9 (the line 3c connecting the fixed positions 2a and 2b), that is, every time the player is damaged. In this way, the game program can allow the player to intuitively understand the damage of the player.

In addition, the game program can make the game over if, for example, one of the objects 4 that come flying from the top of the game field (game screen) one after another has reached the bottom of the game field as described above. At this time, the game program can display the game field in the darkest color and can indicate that the game is over by displaying text at the center of the game screen (see exemplary FIG. 5B). In this way, the game program can allow the player to recognize that the game is over.

Figure 6A:
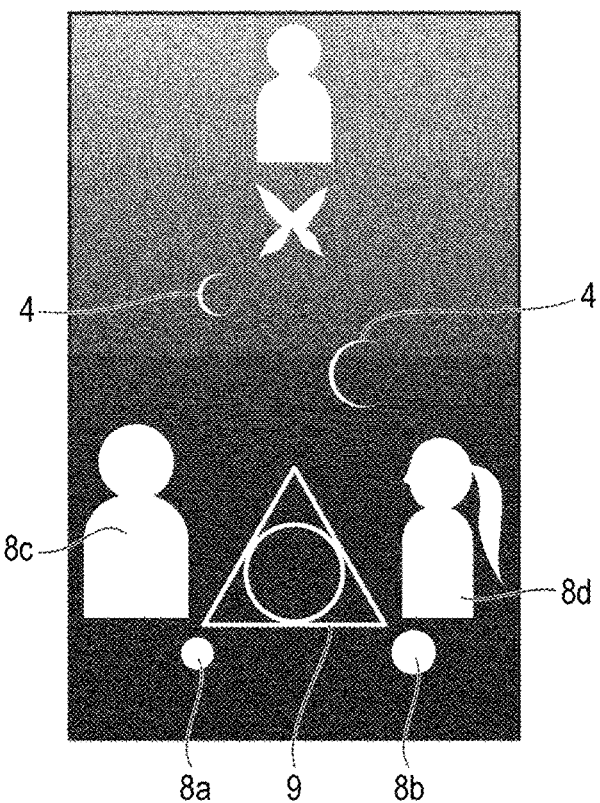
FIG. 6A is a schematic diagram illustrating an example of a design-enhanced game screen.
Figure 6B:
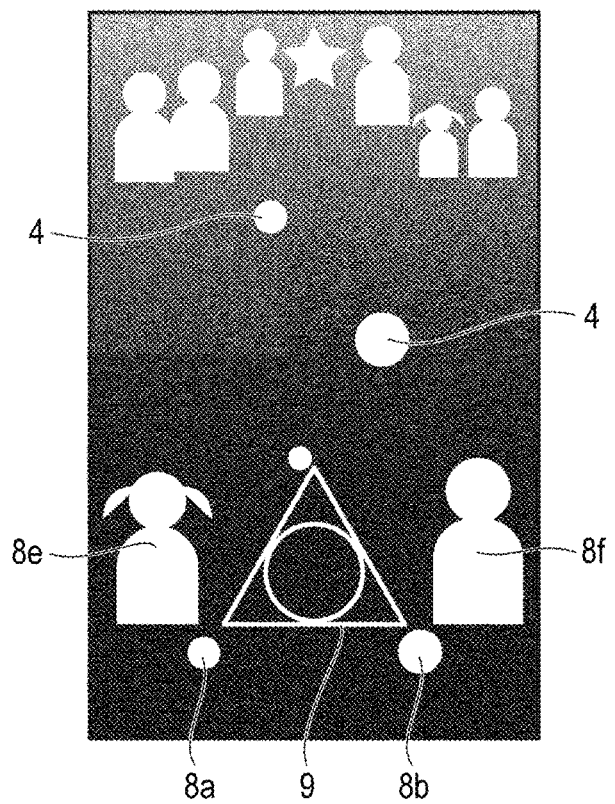
FIG. 6B is a schematic diagram illustrating an example of a design-enhanced game screen.

Exemplary FIGS. 6A and 6B are schematic diagrams each illustrating an example of a designed-enhanced game screen. As illustrated in FIGS. 6A and 6B, the game program can display characters (8c to 8f) owned by the player on the respective sides of the triangle 9.

In some exemplary embodiments, the player may start playing the game after selecting a predetermined number of characters that the player wishes to use from among characters owned by the player, for example. The game program can display the characters such that the characters displayed on the respective sides of the triangle 9 among the preselected characters are changed every time the player taps the input screen 41.

Individual characters may have their own unique skills (attributes), and the property of the bullet 7 fired in the direction A may be decided upon in accordance with the combination of, for example, the skills and colors of the characters. In addition, a predetermined parameter (e.g., attack parameter) may be set for the characters, and the power of attack of the bullet 7 fired in the direction A may be decided upon by the sum of values of the predetermined parameter assigned to the characters.

That is, the game program may identify a characteristic based on a combination of the skills, colors, parameters, or the like, set for individual characters so that a characteristic is identified based on a combination of the attribute information 6a associated with the specified position 1a and the attribute information 6a associated with the specified position 1b as described above. The characteristic determining unit 17 may determine a correlation between the characteristic identified based on the combination and a predetermined characteristic set for the object 4. Depending on the obtained determination result (the determination result 6c), the effect producing unit 14 can produce a predetermined game effect.

In this way, the game program can not only provide the player with new operability but also can make the game more entertaining.

The player can proceed with the game by completing each stage of the game. At this time, the game program can allow various enemy characters (the objects 4) to appear depending on the stage. That is, the game program can display not only the simple circular objects 4 (see exemplary FIGS. 2A to 6B) but also the objects 4 whose appearance, attribute, movement, attack method, and the like, are made different so as to reflect the world of the game which may be formed by the story, background, and presentation of the game, for example. In this way, the game program not only can provide the player with new operability but also can allow the player to be immersed in the game. In addition, the game program can allow a boss character (the object 4) to appear at the end of each stage. In this way, the game program can create a climax at each stage.

In the case where a player plays the game using characters, the game program can (1) increase the power of attack or (2) enable the use of a special move based on a combination of characters at a predetermined probability. In this way, the game program can provide the player with a game with variations. In addition, the game program can strengthen a bond (affinity or cooperativeness) between the characters used in combination. The game program can (1) increase a degree by which the power of attack is increased or (2) increase the power of the special move, as the bond becomes stronger.

In addition, the player can borrow a character owned by another player who is a friend of the player's and play the game using the character. In this way, the game program can increases the number of variations of the combination of characters. In this case, the game program can strengthen a bond (affinity or cooperativeness) between players who have lent and borrowed a character. As the bond becomes stronger, the power of a cooperated play performed by players who have lent and borrowed a character can increase in another game in which a group (guild) constituted by a plurality of players fights against another group (another game called "guild versus guild").

In this way, the game program not only can implement various presentations of the game using characters but also can promote interaction with other players.

Note that the game screen of the game is not limited to the game screens illustrated in exemplary FIGS. 6a and 6b. The game screen may be, for example, (1) a simple game screen in pastel shades, (2) a simple cool game screen in colorful tones, (3) a game screen with a pop atmosphere, or any other type of game screen, as desired.

As described with reference to exemplary FIG. 2B, for example, if the player performs a drag operation with the right thumb touching the touch panel (if the player moves the specified position 1b), the game program (the position identifying unit 12) can move the position 1c on the line 3a in response to the drag operation. Note that an operation performed by the player to move the position 1c on the line 3a is not limited to the drag operation.

Figure 7A:
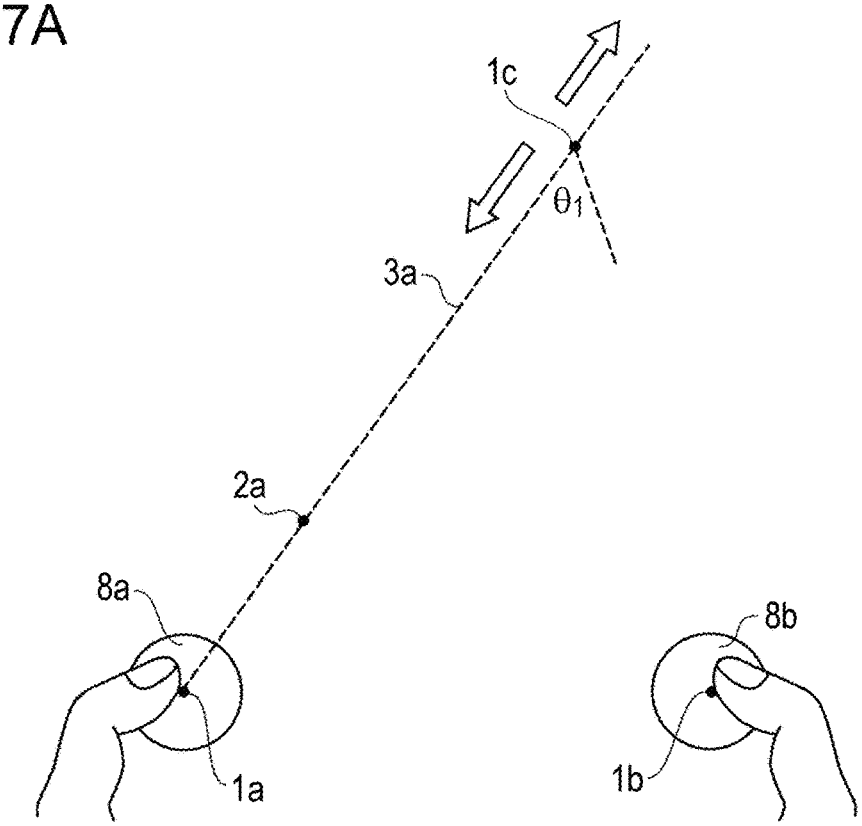
FIG. 7A is a schematic diagram illustrating another example of the operation method for the game implemented by the game program, specifically
Figure 7B:
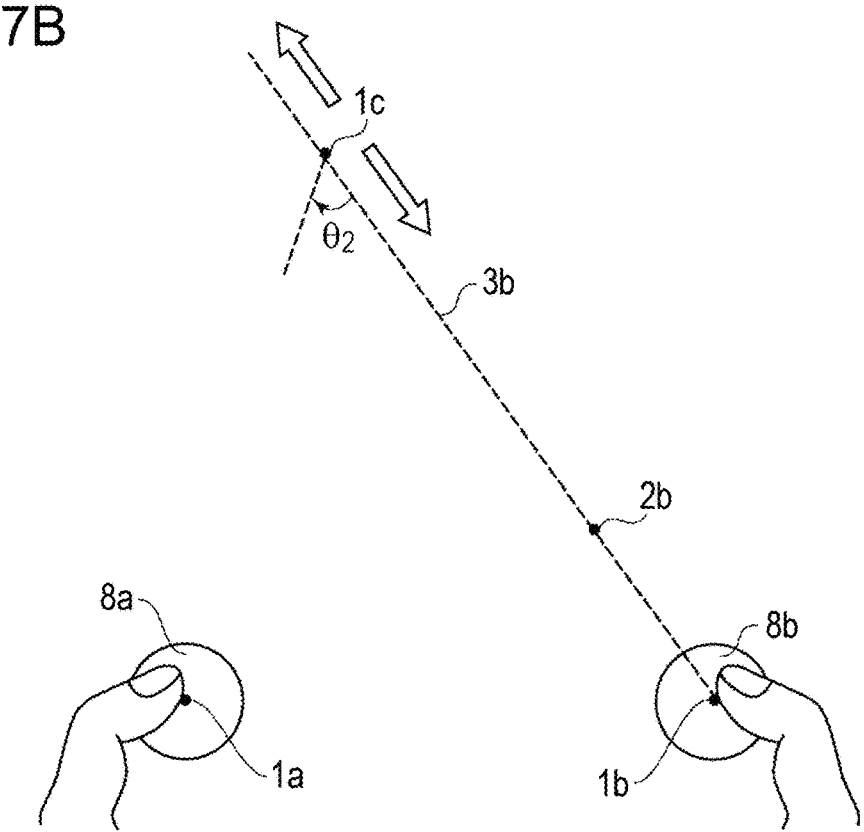
FIG. 7B is a schematic diagram illustrating another example of the operation method for the game implemented by the game program, specifically

Exemplary FIGS. 7A and 7B are schematic diagrams each illustrating another example of the operation method for the game which may be implemented by the game program. In an exemplary embodiment, FIG. 7A may illustrate a process in which the position 1c moves on the line 3a in response to long-pressing the input screen 41 with the left thumb, whereas exemplary FIG. 7B may illustrate a process in which the position 1c moves on the line 3b in response to long-pressing the input screen 41 with the right thumb.

If the position touched with the thumb of the player on the input screen 41 belongs to a left half of the input screen 41 (game field) as illustrated in exemplary FIG. 7A, the position identifying unit 12 may move the position 1c on the line 3a while the touch is being detected (while the operation input by the player is successfully obtained). If the position touched with the thumb of the player on the input screen 41 belongs to a right half of the input screen 41 as illustrated in exemplary FIG. 7B, the position identifying unit 12 may move the position 1c on the line 3b while the touch is being detected.

That is, the position identifying unit 12 can identify the position 1c by, for example, increasing or decreasing an angle $\theta_1$ between the line 3a and the line 3b that passes through the specified position 1b and the position 1c (FIG. 7A) or an angle $\theta_2$ between the line 3b and the line 3a that passes through the specified position 1a and the position 1c (FIG. 7B) while the touch is being detected.

Figure 8A:
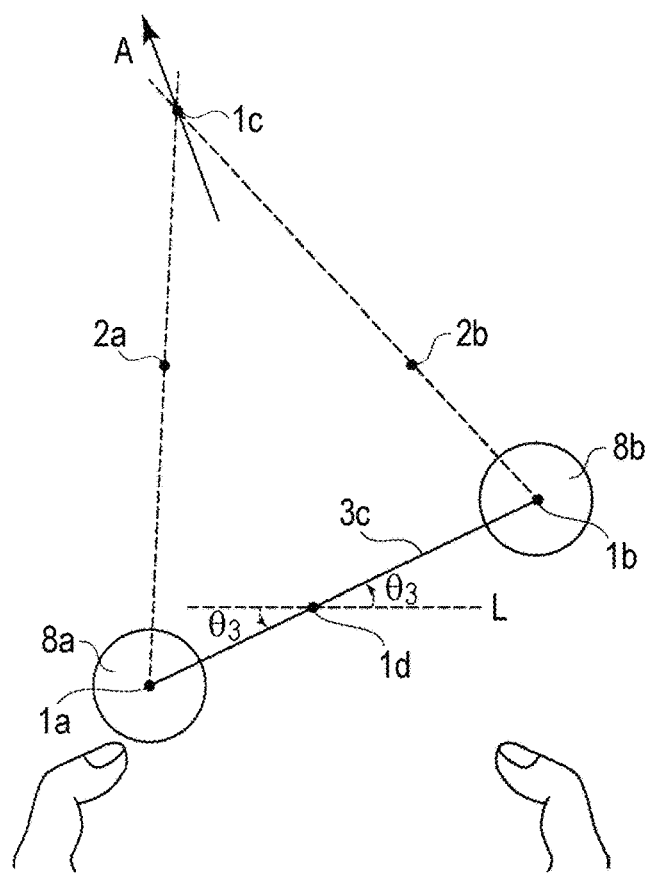
FIG. 8A is a schematic diagram illustrating yet another example of the operation method for the game implemented by the game program, specifically
Figure 8B:
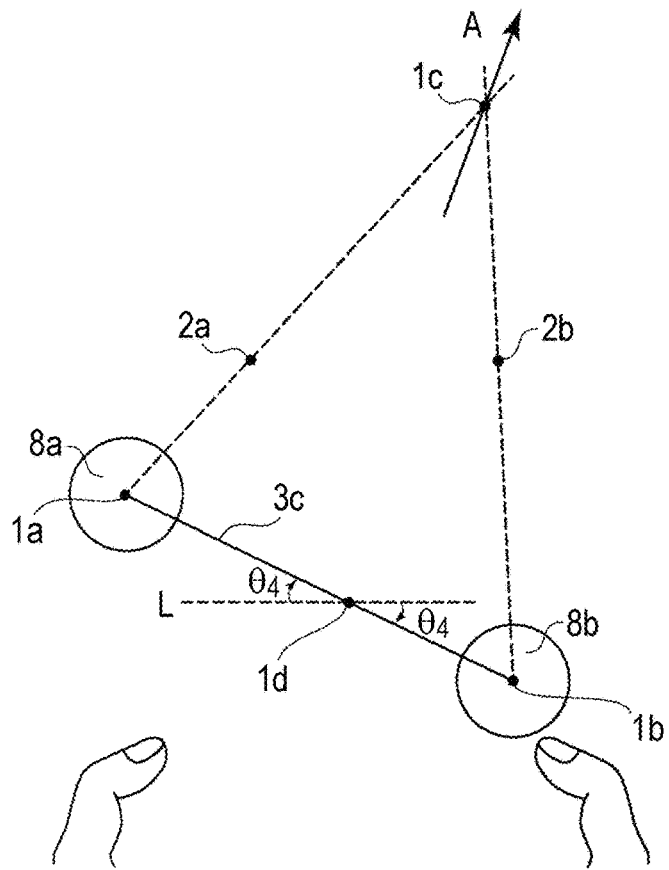
FIG. 8B is a schematic diagram illustrating yet another example of the operation method for the game implemented by the game program, specifically

FIGS. 8A and 8B are schematic diagrams each illustrating examples of the operation method for the game implemented by the game program. In an exemplary embodiment, FIG. 8A illustrates a process in which the specified positions 1a and 1b may rotate counterclockwise in response to long-pressing the input screen 41 with the left thumb, whereas FIG. 8B illustrates a process in which the specified positions 1a and 1b may rotate clockwise in response to long-pressing the input screen 41 with the right thumb.

As illustrated in exemplary FIG. 8A, the player may specify an angle $\theta_3$ between the line 3c and a horizontal line L that passes through a predetermined position (e.g., the position of aim 1d) in the game field, by long-pressing the input screen 41 with the left thumb. Because the player performs a long-press operation, if the position touched with the thumb of the player on the input screen 41 belongs to a left half of the input screen 41 (on the left side of the center of the input screen 41), the position obtaining unit 11 may obtain the coordinate information 5b indicating the specified positions 1a and 1b that rotate about (move around) the position of aim 1d (in response to an operation input by the player) while the touch is being detected.

As illustrated in exemplary FIG. 8B, the player may specify an angle $\theta_4$ between the line 3c and the horizontal line L that passes through a predetermined position (e.g., the position of aim 1d) in the game field, by long-pressing the input screen 41 with the right thumb. Because the player performs a long-press operation, if the position touched with the thumb of the player on the input screen 41 belongs to a right half of the input screen 41 (on the right side of the center of the input screen 41), the position obtaining unit 11 may obtain the coordinate information 5b indicating the specified positions 1a and 1b that rotate about (move around) the position of aim 1d (in response to an operation input by the player) while the touch is being detected.

In other words, the position obtaining unit 11 may obtain the coordinate information 5b (first position information) indicating the specified position 1a and the coordinate information 5b (second position information) indicating the specified position 1b that move on the circumference of a circle centered at a predetermined center position (e.g., the position of aim 1d) set in the game field in response to an operation input by a player. The position identifying unit 12 may then determine the position 1c, for example, such that the position 1c moves, in response to the movement of the specified position 1b indicated by the coordinate information 5b, on the line 3a that passes through the specified position 1a indicated by the coordinate information 5b and the fixed position 2a set in the game field. The aim identifying unit 13 may set the aim in the direction A, which is a direction toward the position 1c from the side where the specified positions 1a and 1b are located and which changes in response to movement of the specified positions 1a and 1b and the position 1c, as the direction in which a predetermined game effect is produced.

The game program can obtain the specified positions 1a and 1b not only in response to a drag operation by a player but also by specifying rotation angles ($\theta_1$ to $\theta_4$) that change in response to a predetermined operation (e.g., a long-press operation). In this way, the game program can provide a player with new operability. Note that the operations for specifying angles that have been described with reference to exemplary FIGS. 7A to 8B may be, for example, a swipe operation or an operation for tilting the mobile terminal 100 as well as a long-press operation, or the like.

Figure 9:
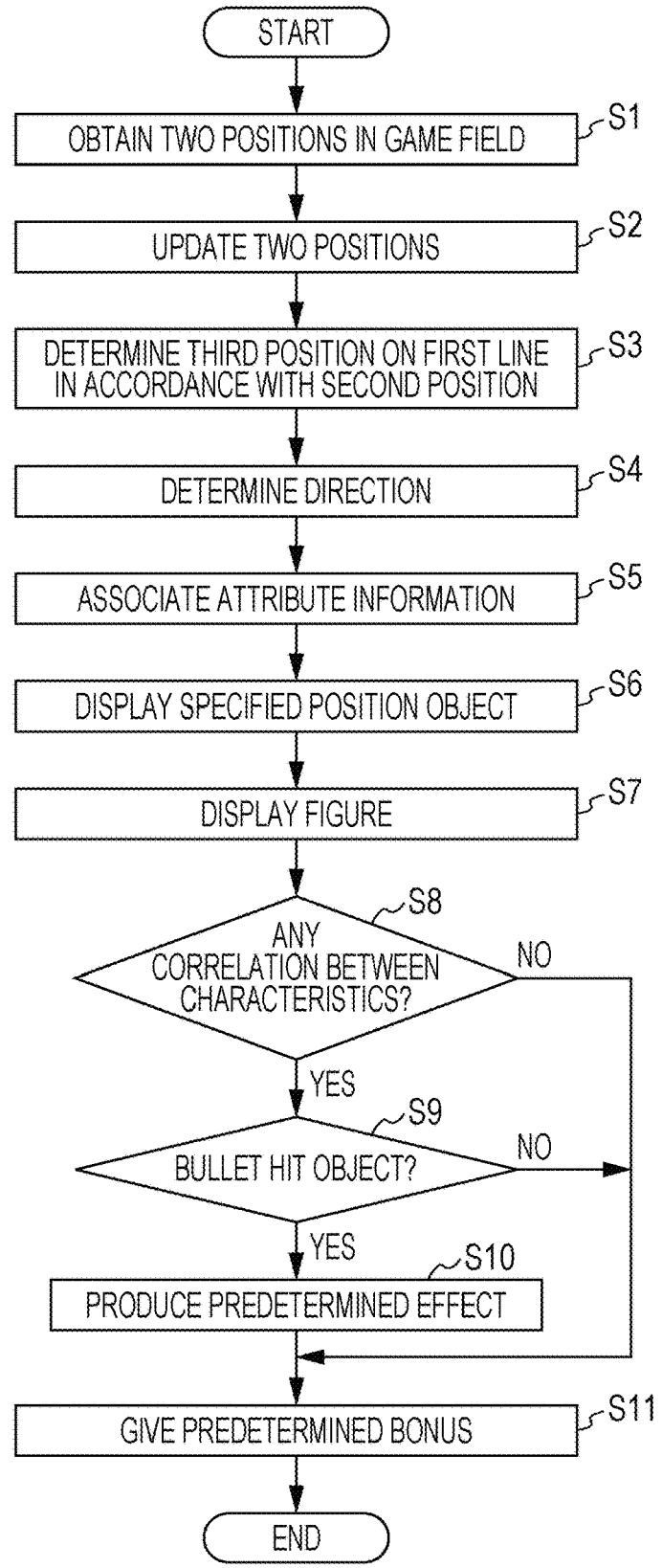
FIG. 9 is a flowchart illustrating an example of a process performed by the mobile terminal.

Exemplary FIG. 9 is a flowchart illustrating an example of a process performed by the mobile terminal 100. Note that each step in parentheses in the following description indicates a corresponding step of a method for controlling a computer.

The position obtaining unit 11 may obtain the coordinate information 5b (first position information) indicating the specified position 1a in the game field and the coordinate information 5b (second position information) indicating the specified position 1b in the game field (step 1; hereinafter "step" is abbreviated as "S": position information obtaining step). The position obtaining unit 11 may then update the coordinate information 5b to move the specified positions 1a and 1b in response to an operation input by the player (S2: position information updating step).

Subsequently, the position identifying unit 12 may determine the position 1c such that the position 1c moves, in response to movement of the specified position 1b indicated by the coordinate information 5b, on the line 3a that passes through the specified position 1a indicated by the coordinate information 5b and the fixed position 2a set in the game field (S3: position identifying step). The aim identifying unit 13 may then determine the direction A in which a predetermined game effect is produced, in accordance with the specified positions 1*a* and 1*b* and the position 1*c* (S4: direction determining step).

The attribute associating unit 15 may associate the attribute information 6*a* with the specified position 1*a* and with the specified position 1*b* obtained by the position obtaining unit 11, in response to the operation input by the player (S5). The display output unit 16 may then output the display information 6*b* for displaying the specified position object 8 that may explicitly indicate at least one of the specified positions 1*a* and 1*b* in accordance with the corresponding attribute information 6*a* associated by the attribute associating unit 15 (S6). The figure display unit 18 may then output the figure information 6*d* for displaying a figure determined based on a relationship (positional relationship) among the specified positions 1*a* and 1*b* and the position 1*c* (e.g., the triangle 9 connecting three points of the fixed positions 2*a* and 2*b* and the position 1*c*, which will be described later) (S7).

The characteristic determining unit 17 may determine a correlation between a characteristic identified by a combination of the attributes and a predetermined characteristic set for the object 4 (S8). If it is determined that the characteristics are correlated with each other (YES in S8), the effect producing unit 14 may determine whether the bullet 7 hits the object 4 (S9). If it is determined that the bullet 7 hits the object 4 (YES in S9), the effect producing unit 14 may produce an effect of reducing the hit points (durability) of the object 4 (S10). Upon the hit points of the object 4 becoming zero, the effect producing unit 14 can produce an effect of destroying the object 4 (S10). Lastly, the bonus giving unit 19 may give a predetermined bonus to the player in accordance with the result of attacking the object 4 (S11).

Note that the control method may include any given processing performed by each unit of the control unit 10 in addition to the processing described above with reference to exemplary FIG. 9.

Further exemplary embodiments will be described with reference to exemplary FIG. 10. Note that a configuration added to the above-described exemplary embodiments and a configuration different from that of the above-described exemplary embodiments will be described. That is, the configuration described in the above described exemplary embodiments can be included in the below described embodiments (and vice versa). In addition, the definitions of the terms described in the above-described embodiments may also apply to the following embodiments.

Figure 10:
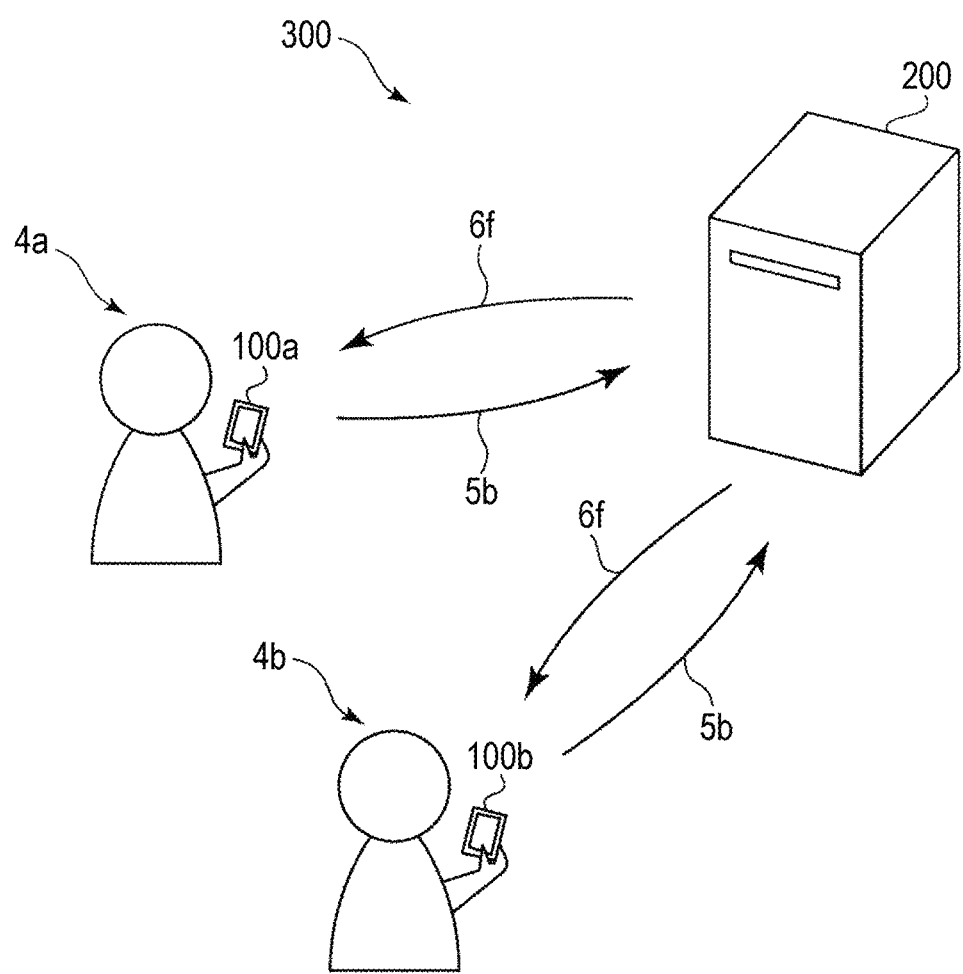
FIG. 10 is a schematic diagram illustrating a configuration of a game system including the mobile terminals and a server apparatus according to an embodiment.

Exemplary FIG. 10 is a schematic diagram illustrating a configuration of a game system 300 including the mobile terminals 100 and a server apparatus 200. A case will be described in which the computer may function as the server apparatus 200 connected to the mobile terminals 100 via a predetermined network so as to be able to communicate with the mobile terminals 100 as illustrated in exemplary FIG. 10 and the game program may be executed by the server apparatus 200. It is assumed that a terminal operated by a player 4*a* is referred to as a mobile terminal 100*a*, and a terminal operated by a player 4*b* is referred to as a mobile terminal 100*b*.

The server apparatus (computer) 200 may be an information processing apparatus capable of executing a game program including part or entirety of the process described in the exemplary embodiments. The server apparatus 200 may obtain the coordinate information 5*b* (first position information) indicating the specified position 1*a* in the game field and the coordinate information 5*b* (second position information) indicating the specified position 1*b* in the game field by receiving them from the mobile terminal 100. The server apparatus 200 may then update the coordinate information 5*b* such that the specified positions 1*a* and 1*b* move in response to an operation input by the player and may determine, as the position 1*c*, a position where the line 3*a* connecting the specified position 1*a* and the fixed position 2*a* set in the game field crosses the line 3*b* connecting the specified position 1*b* and the fixed position 2*b*.

The server apparatus 200 may then determine the direction A in which a predetermined game effect is produced, in accordance with movement of the specified positions 1*a* and 1*b* and the position 1*c*. For example, the server apparatus 200 may set the aim in the direction A, which is a direction toward the position 1*c* from the side where the specified positions 1*a* and 1*b* are located and which changes in accordance with movement of the specified positions 1*a* and 1*b* and the position 1*c*, as the direction in which a predetermined game effect may be produced. The server apparatus 200 may generate the screen information 6*f* for displaying a result of the above-described process at a given timing and sends the screen information 6*f* to the mobile terminal 100.

Based on the screen information 6*f* received from the server apparatus 200, the mobile terminal 100 may display the result of playing the game on the display unit 50. In the case of displaying the play result using a web browser, the mobile terminal 100 can accumulate the information received from the server apparatus 200 in a predetermined storage space (web storage) of the web browser, for example.

As described above, the server apparatus 200 may be configured to include some or all of the units (for example, in the control unit 10) that have been described to be included in the mobile terminal 100 in the exemplary embodiments and to send, to the mobile terminal 100, a game output result obtained based on an input supplied by the mobile terminal 100. In this way, the server apparatus 200 may provide advantageous effects similar to those provided by the mobile terminal 100 when the mobile terminal 100 provides the functions.

The game can be configured as a hybrid game in which each of the server apparatus 200 and the mobile terminal 100 performs part of the process such that the game progress screen is displayed on the mobile terminal 100 based on the data generated by the server apparatus 200 (web display) and the other menu screens or the like are displayed by the native application installed on the mobile terminal 100 (native display), for example.

Even in the case where the game program may be implemented as a native application executed by the mobile terminal 100, the mobile terminal 100 can access the server apparatus 200 if necessary and download and utilize information related to the progress of the game (e.g., information concerning the player, information concerning another player who is a friend of the player's, information concerning the total points earned by the player and items and characters given to the player, information concerning the ranking of the player, and the like). Further, the mobile terminal 100*a* and the mobile terminal 100*b* may be connected to be able to perform communication (via pear-to-pear communication such as near-filed communication using Bluetooth (registered trademark)) and may be synchronized with each other to enable multiple players to play the game.

As described above, the game program, the mobile terminal 100, and the server apparatus according to the exemplary embodiments can provide players with new operability that are different from those provided by existing shooting games in which the players change the target position of attack simply by operating their devices, for example.

The exemplary embodiments have described the shooting game as an example of the game implemented by the game program; however, the game program may implement any other games other than the shooting game.

For example, the game program can implement a puzzle game. In the puzzle game, a figure (e.g., the triangle 9) may be drawn in the game field in accordance with the specified positions 1a and 1b that move in the game field in response to an operation input by a player and in accordance with the position 1c that moves on the line 3a in response to the movement of the specified position 1b, and the puzzle can be solved by using the figure. In this case, the player may cause the game program to draw a figure having a shape that matches the shape of each of the objects that approach the bottom from the top of the game field one after another, by giving the specified positions 1a and 1b to the game program. The game program may determine whether the shape of the figure drawn by the player matches the shape of the object. If the shapes of the figures match, the game program can determine that the player has cleared the puzzle and displays the next puzzle.

In this way, the game program can provide players with new operability in games other than the shooting game.

A control block (for example, the control unit 10) of the mobile terminal 100 or the server apparatus 200 may be implemented by a logic circuit (hardware) formed in an integrated circuit (integrated circuit (IC) chip) or the like or by software using a central processing unit (CPU). In the latter case, the mobile terminal 100 or the server apparatus 200 may include the CPU that executes instructions of the game program which is software implementing the individual functions, a read-only memory (ROM) or storage device (referred to as a "recording medium") on which the game program and various kinds of data may be recorded in a computer (or CPU) readable manner, and a random access memory (RAM) to which the game program may be loaded. The computer (or the CPU) may read the game program from the recording medium and execute the game program, thereby attaining the object of the exemplary embodiments described herein. As the recording medium, a "non-transitory tangible medium", or "non-transitory computer readable medium" for example, a tape, a disc, a card, a semiconductor memory, or a programmable logic circuit can be used. In addition, the game program may be provided to the computer via any given transmission media capable of transmitting the game program (such as a communication network or a broadcast wave). The exemplary embodiments can be implemented as a data signal on a carrier wave, in which the game program is embodied by electronic transmission.

For example, the game program according to the exemplary embodiments may cause a computer (the mobile terminal 100 or the server apparatus 200) to implement the position information obtaining function, the position information updating function, the position identifying function, the direction determining function, the effect producing function, the attribute associating function, the characteristic determining function, the display output function, the figure display output function, and the bonus giving function. The position information obtaining function and position information updating function, the position identifying function, the direction determining function, the effect producing function, the attribute associating function, the characteristic determining function, the display output function, the figure display output function, and the bonus giving function can be respectively implemented by the position obtaining unit 11, the position identifying unit 12, the aim identifying unit 13, the effect producing unit 14, the attribute associating unit 15, the characteristic determining unit 17, the display output unit 16, the figure display unit 18, and the bonus giving unit 19 described above. Details of the individual units are as described above.

The game program can be written in, for example, a script language such as, but not limited to, ActionScript or JavaScript (registered trademark), an object-oriented programming language such as Objective-C or Java (registered trademark), or a markup language such as HyperText Markup Language 5 (HTML5). The game system 300 including an information processing terminal (e.g., the mobile terminal 100) which includes units that implement some of functions implemented by the game program and a server (e.g., the server apparatus 200) which includes units that implement the rest of the functions different from the some functions is also within the scope of the exemplary embodiments described herein.

The present invention is not limited to the embodiments described above and can be variously altered within the scope defined by the appended claims, and embodiments obtained by suitably combining technical means disclosed in different embodiments are also within the technical scope of the present invention. Further, a new technical feature can be formed by combining technical means disclosed in different embodiments.

The present invention is widely applicable to any given computers such as smartphones, tablet terminals, mobile phones, home video game consoles, personal computers, server apparatuses, workstations, or mainframes.

What is claimed is:

1. A computer implemented method for providing a game program, comprising executing on a processor the steps of:
   obtaining, at a position obtaining unit in a control unit of the computer, first position information indicating a first position in a game field and second position information indicating a second position in the game field;
   updating, at the position obtaining unit in the control unit of the computer or a position information updating unit of the control unit, the first position information and the second position information to move the first position and the second position in response to an operation input by a player from an input control unit;
   determining, in a position identifying unit in the control unit of the computer, a third position on a first line in accordance with the second position, the first line being a line that passes through the first position and a predetermined fixed position set in the game field;
   determining, in an aim identifying unit in the control unit of the computer, a predetermined effect to be produced in the game field, and producing a visual indication of the predetermined effect to be produced, the visual indication comprising a visual object disposed between the first position, the second position, and the third position, and further determining a direction in which the predetermined game effect is to be produced;
   producing, by an effect producing unit in the control unit of the computer, the predetermined game effect on an object located in the determined direction,
   wherein the visual object is a triangle having the first position, the second position, and the third position as vertices, wherein the color and shape of the triangle are each adjustable based on adjustable attribute information associated with the first position and adjustable attribute information associated with the second position;

determining, by a display processing unit, whether an attack object hits a base of the triangle; and producing, by the effect producing unit, an effect of changing a predetermined player parameter based on triangle area information from a figure display unit.

2. The computer implemented method for providing a game program according to claim 1, further comprising executing on a processor the step of:

reducing, by the display processing unit, a player health upon determining that the attack object hits the base of the triangle.

3. The computer implemented method for providing a game program according to claim 2, further comprising executing on a processor the step of:

ending, by the display processing unit, a game upon the player health reaching zero.

4. The computer implemented method for providing a game program according to claim 1, further comprising executing on a processor the step of:

ending, by the display processing unit, a game upon determining that the attack object hits the base of the triangle.

5. The computer implemented method for providing a game program according to claim 1, further comprising executing on a processor the step of:

increasing brightness of the game field upon production of a predetermined game effect on the attack object.

6. The computer implemented method for providing a game program according to claim 5, wherein the attribute information at least includes information indicating a shape, a color, an image, or a pattern of the specified position object or a combination thereof, and wherein the display processing unit outputs display information to the display unit for displaying the specified position object in accordance with the information indicating a shape, a color, an image, or a pattern of the specified position object or a combination thereof included in the attribute information.

7. The computer implemented method for providing a game program according to claim 1, further comprising executing on a processor the step of:

decreasing brightness of the game field upon determining the attack object hits the base of the triangle.

8. The computer implemented method for providing a game program according to claim 1, wherein each of the first position and the second position moves in response to a drag operation by the player.

9. The computer implemented method for providing a game program according to claim 8, wherein a player can avoid the attack object by adjusting at least one of the first position and the second position.

10. The computer implemented method for providing a game program according to claim 1, wherein each of the first position and the second position rotates about a predetermined position in accordance with a rotation angle specified by an operation input by the player.

11. The computer implemented method for providing a game program according to claim 1, wherein the position identifying unit determines, as the third position, a position where the first line crosses a second line connecting the second position and another fixed position different from the predetermined fixed position.

12. The computer implemented method for providing a game program according to claim 11, wherein the aim identifying unit determines, as the direction in which the predetermined game effect is produced, a direction including a line of aim connecting the third position and a position of aim on a third line extending from the predetermined fixed position to the other fixed position.

13. The computer implemented method for providing a game program according to claim 12, wherein the position of aim is a position corresponding to a middle point of the third line.

14. The computer implemented method for providing a game program according to claim 1, wherein a game based on the game program is a shooting game for attacking the attack object displayed in the game field, and wherein the predetermined game effect is an effect of attacking the attack object located in the direction determined by the aim identifying unit.

15. The computer implemented method for providing a game program according to claim 14, further comprising executing on a processor the step of:

giving, by a bonus giving unit in the control unit of the computer, a predetermined bonus to the player in accordance with a result of attacking the attack object.

16. The computer implemented method for providing a game program according to claim 1, further comprising executing on a processor the step of:

associating, at an attribute associating unit in the control unit of the computer, attribute information with the first position and attribute information with the second position in response to the operation input by the player, wherein the predetermined game effect and the visual indication are produced in accordance with a combination of the attribute information associated with the first position and the attribute information associated with the second position.

17. The computer implemented method for providing a game program according to claim 16, further comprising executing on a processor the step of:

determining, at a characteristic determining unit in the control unit of the computer, a correlation between a characteristic set for the attack object and a characteristic identified by a combination of the attribute information associated with the first position and the attribute information associated with the second position, wherein the predetermined game effect is changed depending on a determination result obtained by the characteristic determining unit.

18. The computer implemented method for providing a game program according to claim 17, wherein producing the predetermined game effect on the attack object located in the determined direction changes one or more attributes of the attack object; and wherein the step of changing the predetermined game effect depending on the determination result comprises increasing or decreasing an effect of changing the one or more attributes of the attack object.

19. The computer implemented method for providing a game program according to claim 16, further comprising executing on a processor the step of:

outputting display information from a display processing unit in the control unit of the computer for displaying on a display unit a specified position object that explicitly indicates at least one of the first position and the second position in accordance with the corresponding attribute information associated by the attribute associating unit.

20. The computer implemented method for providing a game program according to claim 16, wherein the attribute information associated with the first position has a first predetermined game effect associated therewith, and wherein the attribute information associated with the second position has a second predetermined game effect associated therewith, and wherein the predetermined game effect is changed based on a synthesis of the first predetermined game effect associated with the first position and the second predetermined game effect associated with the second position.

\* \* \* \* \*